US012786057B2

(12) United States Patent
Phan et al.

(10) Patent No.: US 12,786,057 B2
(45) Date of Patent: Nov. 3, 2026

(54) MANAGEMENT OF NETWORK DEVICES IN SERVERS

(71) Applicant: Super Micro Computer, Inc., San Jose, CA (US)

(72) Inventors: Manhtien V. Phan, Morgan Hill, CA (US); Dong Han, San Jose, CA (US); Hao Hung Chai, New Tapei City (TW)

(73) Assignee: SUPER MICRO COMPUTER, INC., San Jose, CA (US)

( * ) Notice: Subject to any disclaimer, the term of this patent is extended or adjusted under 35 U.S.C. 154(b) by 51 days.

(21) Appl. No.: 18/954,248

(22) Filed: Nov. 20, 2024

(65) Prior Publication Data

US 2026/0142878 A1 May 21, 2026

(51) Int. Cl.

| | |
|---|---|
| ***H04L 41/0823*** | (2022.01) |
| ***H04L 41/0654*** | (2022.01) |
| ***H04L 43/08*** | (2022.01) |

(52) U.S. Cl.
CPC ...... *H04L 41/0823* (2013.01); *H04L 41/0654* (2013.01); *H04L 43/08* (2013.01)

(58) Field of Classification Search
CPC .. H04L 41/0823; H04L 41/0654; H04L 43/08
See application file for complete search history.

(56) References Cited

U.S. PATENT DOCUMENTS

| | | | | |
|---|---|---|---|---|
| 9,565,080 | B2 * | 2/2017 | Jain | H04L 41/0663 |
| 10,326,642 | B2 * | 6/2019 | Markowitz | H04L 67/303 |
| 2011/0055138 | A1 * | 3/2011 | Khanduja | G06F 11/30 709/224 |
| 2016/0072891 | A1 * | 3/2016 | Joshi | G05D 23/1393 370/254 |
| 2016/0105814 | A1 * | 4/2016 | Hurst | H04L 67/025 370/252 |
| 2017/0180192 | A1 * | 6/2017 | Markowitz | G08B 29/04 |
| 2018/0060153 | A1 * | 3/2018 | Innes | H04L 41/06 |
| 2018/0268814 | A1 * | 9/2018 | SaganeGowda | G10L 15/063 |
| 2018/0288567 | A1 * | 10/2018 | Maloney | H04L 67/54 |
| 2019/0081865 | A1 * | 3/2019 | Schrupp | G06N 20/00 |
| 2019/0236022 | A1 * | 8/2019 | Gopal | G06F 9/468 |
| 2019/0261197 | A1 * | 8/2019 | Bellamkonda | H04L 41/0823 |
| 2020/0028904 | A1 * | 1/2020 | Delbecq | H04L 41/145 |
| 2020/0162503 | A1 * | 5/2020 | Shurtleff | H04L 41/0894 |

* cited by examiner

*Primary Examiner* — Javier O Guzman
(74) *Attorney, Agent, or Firm* — Morgan, Lewis & Bockius LLP

(57) ABSTRACT

This application is directed to managing network devices of an electronic device or system (e.g., a server disposed in a server rack). A computer system includes a first processor device and a plurality of network devices coupled to the first processor. The plurality of network devices include a first set of primary network devices and a set of supplemental network devices, and are configured to receive input signals and provide output signals. The first processor device is configured to monitor operations of the first set of primary network devices, and in accordance with a determination that a first primary network device of the first set of primary network devices has an error, configure a first supplemental network device of the set of one or more supplemental network devices to replace the first primary network device.

20 Claims, 12 Drawing Sheets

1000

MANAGEMENT OF NETWORK DEVICES IN SERVERS

TECHNICAL FIELD

This application relates generally to computer technology including, but not limited to, methods, apparatuses, structures, devices, and systems for managing network devices of a computer device or system (e.g., disposed in a server rack).

BACKGROUND

Servers play a central role in powering big data and artificial intelligence (AI) applications by providing processing power, storage, and network capabilities required to manage and analyze massive volumes of data generated by various sources, including Internet of Things (IOT) devices, social media, and enterprise systems. A server relies heavily on network devices like network device cards (NICs), routers, and switches to communicate with other servers, devices, and the Internet. These network devices work closely with the server's processors to manage data transfer, routing, and traffic control, ensuring seamless communication. However, potential issues with these network devices can lead to significant disruptions. For instance, a faulty NIC can cause packet loss, resulting in poor data transmission quality or even connection drops. Routers or switches experiencing high traffic or misconfiguration may lead to bottlenecks or latency spikes, affecting the server's performance and response time. Additionally, outdated firmware on network devices can lead to compatibility issues with newer processors, causing unexpected crashes or system instability.

SUMMARY

In accordance with some embodiments of this application disclosed herein is at least the realization that regular monitoring, firmware updates, and maintenance of network devices applied in a server are crucial to ensure that the server operates efficiently and maintains stable connectivity. Various embodiments of this application are directed to methods, apparatuses, structures, devices, and systems for managing network devices of a computer device or system (e.g., a server computer disposed in a server rack). A server includes one or more supplemental network devices in addition to a set of primary network devices that have been coupled and configured to work with processors of the server. Upon detecting an error with one of the set of primary network devices, the server configures one of the one or more supplemental network devices to replace the one of the set of primary network devices having the error, e.g., without disrupting operations of an associated processor coupled to the one of the set of primary network devices.

In some embodiments, a server is applied to implement artificial intelligence operations (e.g., model training, data inference). When one of a plurality of primary network devices disposed on a substrate (e.g., a printed circuit board (PCB)) fails its operation, a supplemental network device replaces the failed primary network device, e.g., by applying a simple command via an intelligent platform management interface (IPMI) associated with a baseboard management controller (BMC) of the server.

In one aspect, some implementations include a computer system further including a plurality of network devices and a first processor device coupled to the plurality of network devices. The plurality of network devices are configured to receive input signals and provide output signals, e.g., according to a plurality of network protocols, and include a first set of primary network devices and a set of one or more supplemental network devices. The first processor device is configured to monitor operations of the first set of primary network devices, and in accordance with a determination that a first primary network device of the first set of primary network devices has an error, configure a first supplemental network device of the set of one or more supplemental network devices to replace the first primary network device.

In some embodiments, the first processor device is further configured to pair a plurality of second processor devices with the first set of primary network devices by pairing each second processor device with at least one distinct primary network device of the first set of primary network devices. Further, in some embodiments, the first processor device includes a central processing unit (CPU), and each second processor device includes a graphics processing unit (GPU). Additionally, in some embodiments, the computer system further includes the plurality of second processor devices.

In some embodiments, the first processor device is configured to execute a firmware program to determinate that the first primary network device has the error and enable a system management mode (SMM) in which the first supplemental network device replaces the first primary network device. Alternatively, in some embodiments, the first processor device is configured to execute an operating system including an error handler to determinate that the first primary network device has the error, release the first primary network device, and retrain and engage the first supplemental network device.

In some embodiments, the error includes one of a hardware failure of the first primary network device, a driver or firmware issue, a resource exhaustion or overload, a signal integrity issue, and a link layer protocol error.

In another aspect, some implementations include a method implemented at a computer system including a plurality of network devices and a first processor device coupled to the plurality of network devices. The plurality of network devices include a first set of primary network devices and a set of supplemental network devices. The method includes monitors operations of the first set of primary network devices. The method further includes in accordance with a determination that a first primary network device of the first set of primary network devices has an error, configuring a first supplemental network device of the set of one or more supplemental network devices to replace the first primary network device.

In yet another aspect, some implementations include a computer system. The computer system includes a plurality of network devices for receiving input signals and providing output signals, e.g., according to a plurality of network protocols. The plurality of network devices include a first set of primary network devices and a set of supplemental network devices. The computer system further includes a first processor device coupled to the plurality of network devices and memory having instructions stored thereon, which when executed by the one or more processors cause the processors to perform operations including monitoring operations of the first set of primary network devices, and in accordance with a determination that a first primary network device of the first set of primary network devices has an error, configuring a first supplemental network device of the set of one or more supplemental network devices to replace the first primary network device.

In yet another aspect, some implementations include a non-transitory computer-readable storage medium storing one or more programs, which when executed by a first processor device of a computer system cause the first processor to perform operations comprising monitoring operations of a first set of primary network devices. The first processor device is coupled to a plurality of network devices, and the plurality of network devices include the first set of primary network devices and a set of supplemental network devices. The one or more programs further include instructions for monitoring operations of a first set of primary network devices, and in accordance with a determination that a first primary network device of the first set of primary network devices has an error, configuring a first supplemental network device of the set of one or more supplemental network devices to replace the first primary network device.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

Various embodiments of this application are directed to methods, apparatuses, structures, devices, and systems for managing network devices of a computer device or system (e.g., a server computer disposed in a server rack). A server includes one or more supplemental network devices in addition to a set of primary network devices that have been coupled and configured to work with processors of the server. Upon detecting an error with one of the set of primary network devices, the server configures one of the one or more supplemental network devices to replace the one of the set of primary network devices having the error, e.g., without disrupting operations of an associated processor coupled to the one of the set of primary network devices.

Figure 1:
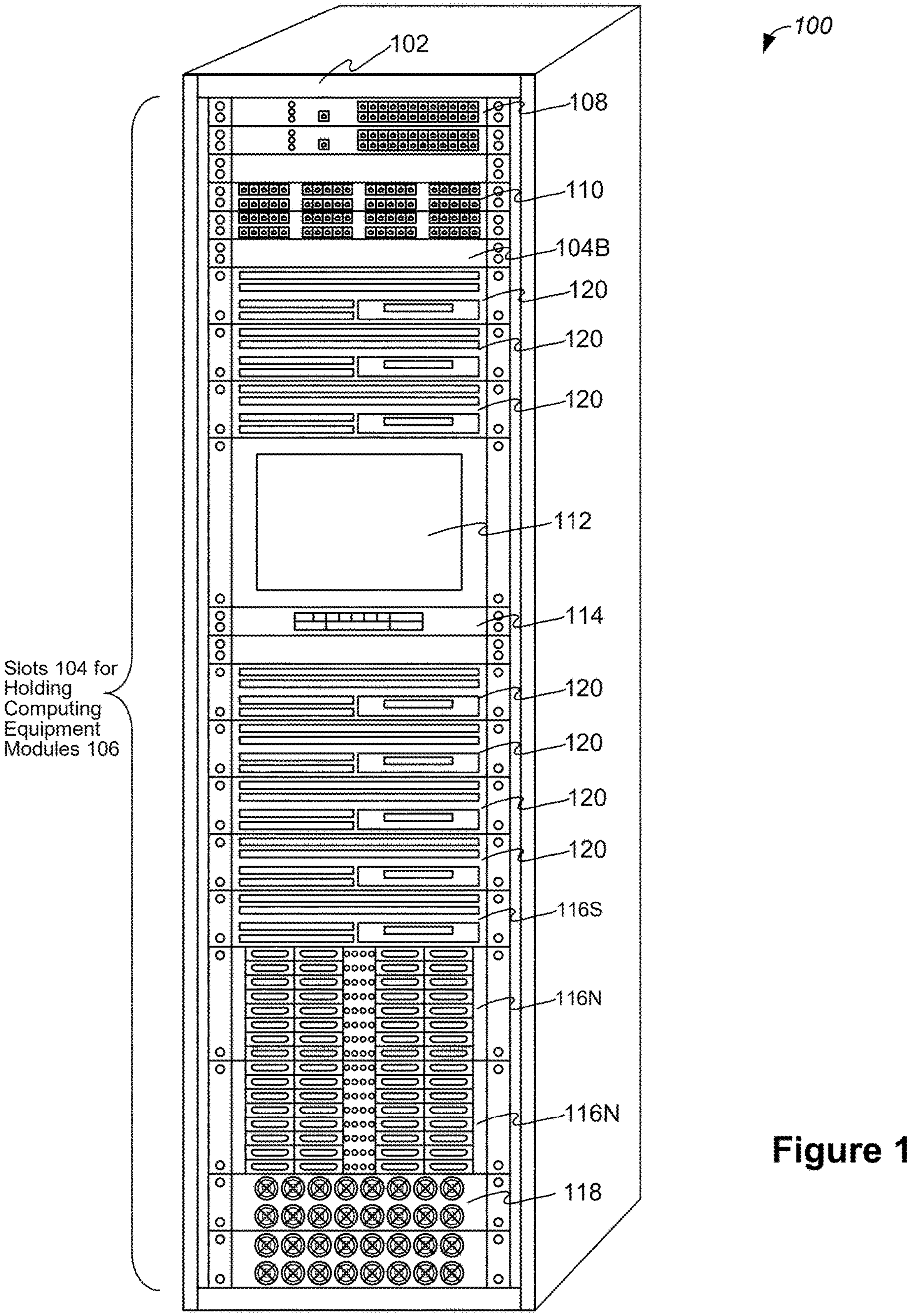
FIG. 1 is a front view of an example server rack that supports one or more servers, in accordance with some embodiments.

FIG. 1 is a front view of an example server rack 100 (also known as a rack mount, a rack cabinet, or simply a rack) that supports one or more servers 120, in accordance with some embodiments. The server rack 100 includes a frame 102 and a plurality of slots 104, and may be used in a data center, a server room, or a network closet for supporting, organizing, and managing a plurality of computing equipment modules 106 (e.g., servers 120, storage devices 116S and 116N, networking equipment, and other types of hardware). Each of the plurality of slots 104 of the server rack 100 is configured to receive and support a respective computing equipment module 106. In some embodiments, the plurality of slots 104 include at least one blank slot 104B that is not used to provide mechanical support to any equipment module 106 and can receive an equipment module 106 if needed. In some implementations, the server rack 100 has a predefined width of 19 or 23 inches, a height up to 84 inches or more, and a depth selected from 24, 32, 40, or 48 inches. A rack unit (1U) is a standard size for a server 120 and other equipment modules 106 that are installed in the server rack 100. The server rack 100 offers room for the server 120 and other equipment modules 106, which are 19 inch wide and have heights (e.g., 1U, 2U, 4U), expressed in rack units.

Examples of the computing equipment modules 106 supported by the plurality of slots 104 of the server rack 100 include, but are not limited to, a firewall module 108, a switch box 110, a server 120, a display device 112, a keyboard 114, a solid-state drive (SSD) 116S, a network-attached storage 116N, and an uninterruptible power supply (UPS) 118. Each computing equipment module 106 plays a respective role in maintaining a network and computing environment. In some embodiments, a firewall module 108 is a network security device that monitors and controls incoming and outgoing network traffic based on predetermined security rules, thereby establishing a barrier between a trusted internal network and untrusted external networks. The firewall module 108 may be placed near a network ingress point to protect the server rack 100 from unauthorized access, malware, and cyberattacks. In some embodiments, the firewall module 108 includes packet filtering, stateful inspection, VPN support, and intrusion prevention systems (IPS). In some embodiments, a switch box 110 is placed near the network ingress point jointly with the firewall module 108, and configured to receive incoming signals and forward the incoming signals (e.g., which may be converted to electrical signals) to different servers 120 mounted on the server rack 100. The switch box 110 is applied in the server rack 100 to minimize cable length and ensure efficient network traffic management. The switch box 110 may support different speeds (e.g., 800 gigabits per second (Gbps), 1.6 Tbs, 3.2 Tbs), have multiple ports (24, 48, etc.), and offer features like virtual local area network (VLAN) support, PoE (Power over Ethernet), and managed or unmanaged capabilities.

The plurality of computing equipment modules 106 of the server rack 100 may include a plurality of servers 120 each of which is configured to provides data, resources, services, or programs to other client devices over one or more wired or wireless communication networks. Each server 120 is mounted in a slot 104 of the server rack 100 and configured to provide one or more services (e.g., web hosting, database management, and application support). The servers 120, mounted on the server rack 100, may provide higher processing power, large memory capacity, redundant power supplies, and hot-swappable components for high availability and reliability compared with individual client devices. In some embodiments, the one or more rack servers 120 include a plurality of graphics processing units (GPU) configured to implement machine learning operations, e.g., in a data center associated with machine learning tasks. In some embodiments, the server 120 includes one or more processors, memory storing one or more programs for execution by the one or more processors, and a system housing for enclosing the one or more processors, the memory, and a power supply component.

The SSD 116S and the network-attached storage 116N are configured to provide storage space for the servers 120 installed in the server rack 100. The SSD uses flash memory to store data and shows high speed, low latency, durability, and lower power consumption, and diverse capacities and form factors compared to hard drive devices (HDDs). Conversely, the network-attached storage (NAS) 116N is a dedicated file storage device that provides data access to a network and allows a large number of different types of client devices to retrieve data from centralized disk capacity. In some embodiments, the network-attached storage 116N may have a high capacity, redundant array of independent disks (RAID), support for a plurality of file-sharing protocols (NFS, SMB/CIFS, FTP), user management, and backup features. In some embodiments, the SSDs 116S are storage drives for speed, and for example, used within the servers 120 disposed on the same server rack 100, while the NAS 116N is configured for file sharing, data backup, and remote access.

In some implementations, the UPS 118 is applied to provide emergency power to other computing equipment modules 106 in case of a power outage, allowing them to remain operational long enough to safely shut down or switch to an alternative power source. In an example, the UPS 118 is mounted in the server rack 100 or placed on a bottom slot to support the weight, providing backup power to other computing equipment modules 106. The UPS 118 provides one or more of battery backup, surge protection, voltage regulation, real-time monitoring, management software, and/or varying runtimes based on capacity and load.

The server rack 100 further includes a plurality of mechanical structures configured to provide mechanical support, or facilitate access, to the plurality of computing equipment modules 106. The plurality of mechanical structures include one or more of: an open frame rack (e.g., having no door or side panel), mounting rails, cable management features (e.g., arms, hooks, and trays), power strips, shelves, drawers, and blanking panels. In some embodiments, the plurality of mechanical structures also includes a rack enclosure (e.g. cabinet), lockable doors, and side panels to protect the computing equipment modules 106 from unauthorized access. In an example, the server rack 100 includes, or is coupled to, a plurality of panels configured to convert the server rack 100 to a server cabinet. In some embodiments, the server rack 100 further includes a cooling system or a ventilation system to facilitate heat dissipation. Using a server rack 100 helps optimize space, improve cooling efficiency, simplify maintenance, and enhance the overall organization and management of information technology (IT) infrastructure.

Figure 2:
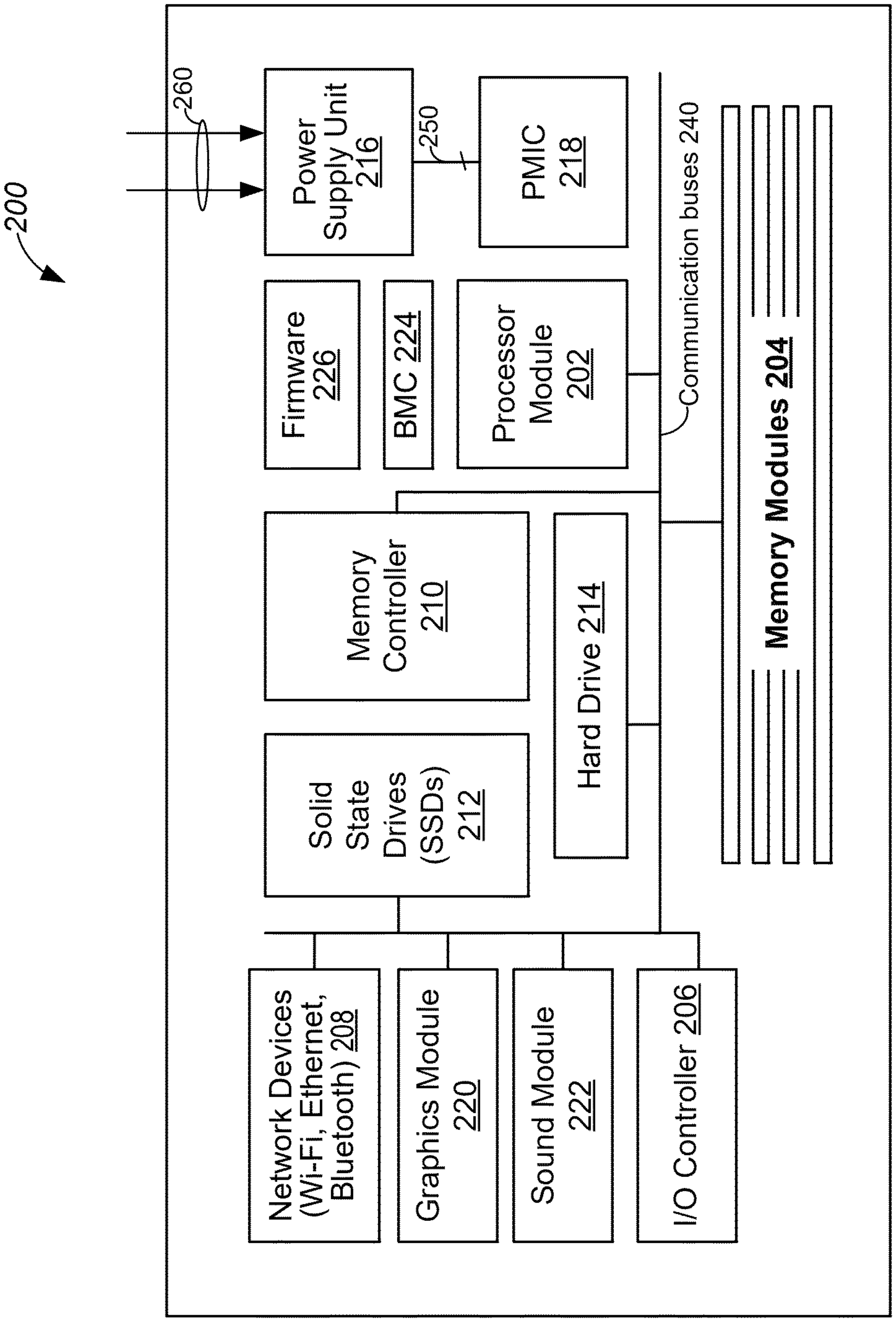
FIG. 2 is a block diagram of an example system module in a typical computer device, which may be applied as a server in FIG. 1, in accordance with some embodiments.

FIG. 2 is a block diagram of an example system module 200 in a typical electronic device, which may be applied as a server 120 in FIG. 1, in accordance with some embodiments. The system module 200 in this electronic device includes at least a processor module 202, memory modules 204 for storing programs, instructions and data, an input/output (I/O) controller 206, one or more communication interfaces such as network devices 208, and one or more communication buses 240 for interconnecting these components. In some embodiments, the I/O controller 206 allows the processor module 202 to communicate with an I/O device (e.g., a keyboard, a mouse or a track-pad) via a universal serial bus interface. In some embodiments, the network devices 208 includes one or more interfaces (e.g., for Wi-Fi, Ethernet, and Bluetooth networks) each allowing the electronic device to exchange data with another external source, e.g., a server or another electronic device. In some embodiments, the communication buses 240 include circuitry (sometimes called a chipset) that interconnects and controls communications among various system components included in the system module 200.

In some embodiments, the processor module 202 includes one or more central processing units (CPU). In some embodiments, the processor module 202 includes one or more graphics processing units (GPUs), a digital signal processor (DSP), a field-programmable gate array (FPGA), an application-specific integrated circuit (ASIC), a tensor processing unit (TPU), a microcontroller (MCU), a neural processing unit (NPU), or a combination thereof. In some embodiments, the system module 200 further includes a baseboard management controller (BMC) 224 disposed on a motherboard and for remote management (e.g., IPMI, Redfish standard). The BMC 224 is configured to provide an interface to allow administrators to monitor, troubleshoot, and update the server 120 without physical access. In some embodiments, the system module 200 further includes BIOS/UEFI firmware 226 (e.g., contained on the motherboard) configured to initialize and test hardware components during startup and provide an interface to configure hardware settings.

More specifically, in some embodiments, a network device 208 applied in a server 120 is configured to manage, route, or facilitate network traffic, enabling communication within a network or the Internet. Examples of the network device 208 include, but are not limited to an NIC (e.g., an Ethernet or Wi-Fi adapter), a network switch, a network router, a load balancer, a firewall, a wireless access point (WAP) device, a modem, a repeater node, a network hub, a network bridge, a gateway, an intrusion detection and prevention systems, and a virtual private network (VPN) appliance. In some embodiments, a subset of network devices 208 are configured to exchange data with another external source for the one or more CPUs. Alternatively and additionally, in some embodiments, a subset of network devices 208 are configured to exchange data with external sources for non-CPU processors (e.g., GPUs). In some implementations, a plurality of network devices 208 are applied in a network infrastructure of the server 120, e.g., in a data center or enterprise environment.

In some embodiments, the memory modules 204 include high-speed random-access memory, such as DRAM, static random-access memory (SRAM), double data rate (DDR) dynamic random-access memory (RAM), or other random-access solid state memory devices. In some embodiments, the memory modules 204 include non-volatile memory, such as one or more magnetic disk storage devices, optical disk storage devices, flash memory devices, or other non-volatile solid state storage devices. In some embodiments, the memory modules 204, or alternatively the non-volatile memory device(s) within the memory modules 204, include a non-transitory computer readable storage medium. In some embodiments, memory slots are reserved on the system module 200 for receiving the memory modules 204. Once inserted into the memory slots, the memory modules 204 are integrated into the system module 200.

In some embodiments, the system module 200 further includes one or more components selected from a memory controller 210, solid state drives (SSDs) 212, a hard disk drive (HDD) 214, a power supply unit (PSU) 216, power management integrated circuit (PMIC) 218, a graphics module 220, and a sound module 222. The memory controller 210 is configured to control communication between the processor module 202 and memory components, including the memory modules 204, in the electronic device. The SSDs 212 are configured to apply integrated circuit assemblies to store data in the electronic device, and in many embodiments, are based on NAND or NOR memory configurations. The HDD 214 is a conventional data storage device used for storing and retrieving digital information based on electromechanical magnetic disks. The PSU 216 is configured to receive a plurality of power supply signals 260 and provide a plurality of DC power supplies 250 (e.g., 12V, 54V). The PMIC 218 is configured to modulate the plurality of DC power supplies 250 to other desired DC voltage levels, e.g., 5V, 3.3V or 1.8V, as required by various components or circuits (e.g., the processor module 202) within the electronic device. The graphics module 220 is configured to generate a feed of output images to one or more display devices according to their desirable image/video formats. The sound module 222 is configured to facilitate the input and output of audio signals to and from the electronic device under control of computer programs.

It is noted that communication buses 240 also interconnect and control communications among various system components including components 210-224.

Figure 3A:
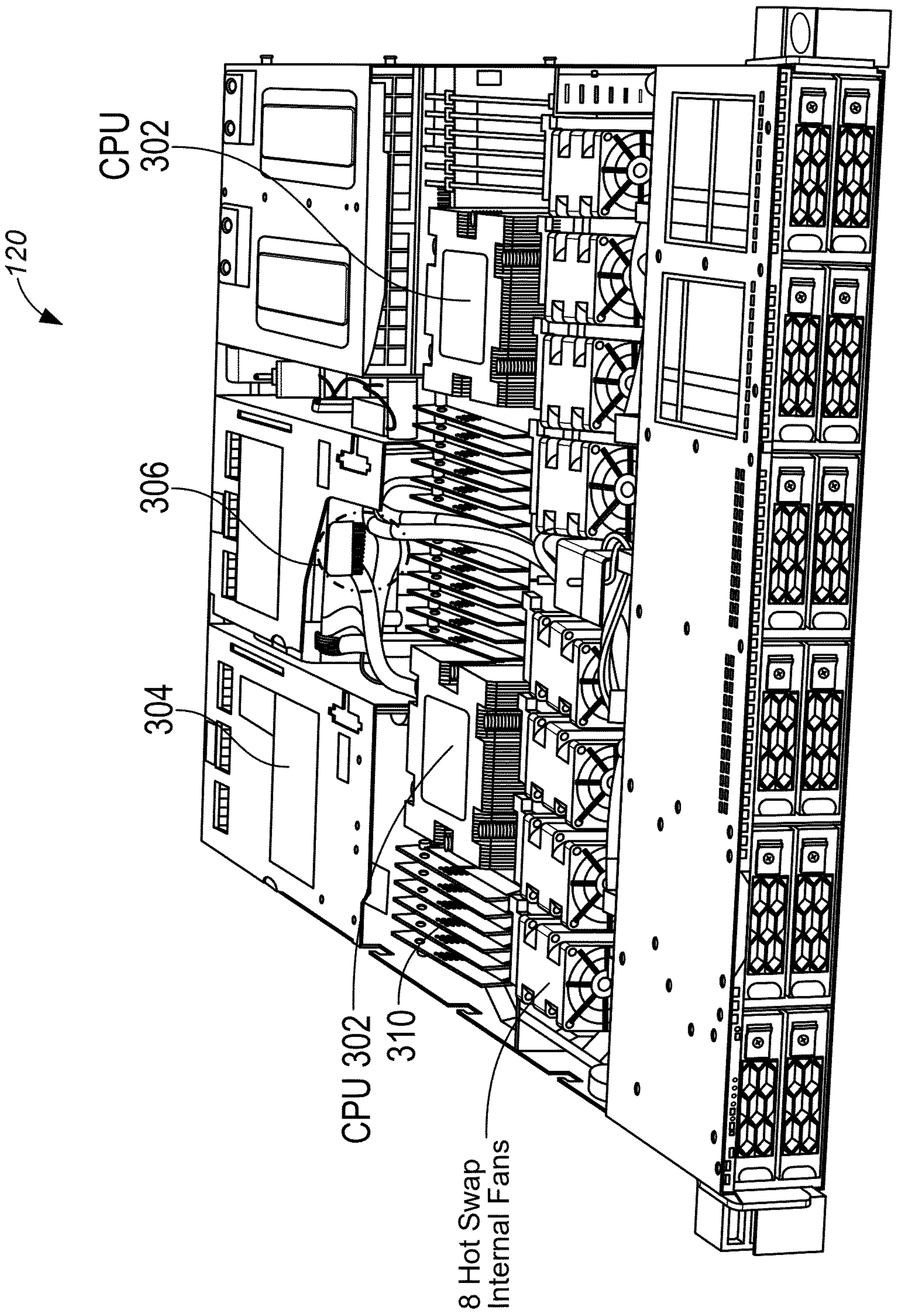
FIGS. 3A, 3B, and 3C are a perspective view, a front view, and a rear view of an example server, in accordance with some embodiments, respectively.
Figure 3B:
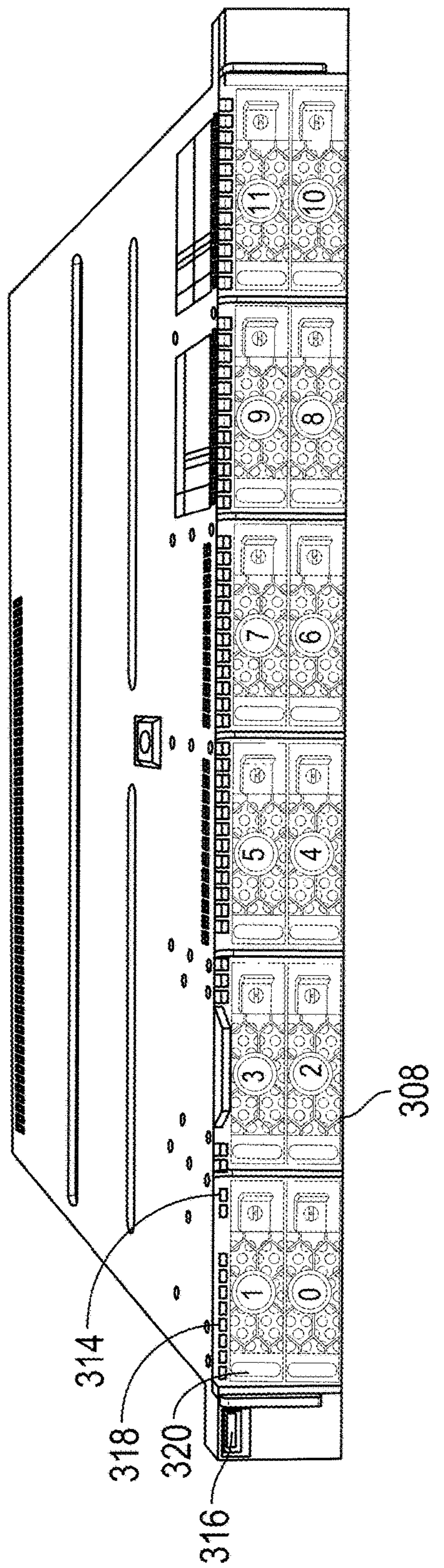
Figure 3C:
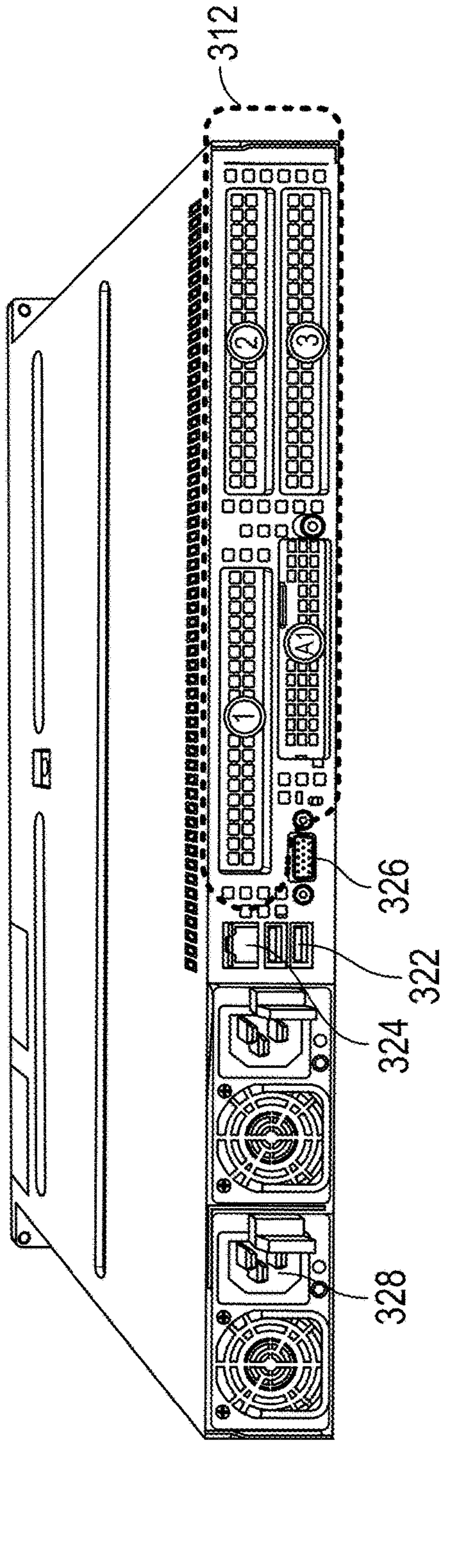

FIGS. 3A, 3B, and 3C are a perspective view, a front view, and a rear view of an example server 120, in accordance with some embodiments, respectively. The server 120 includes two CPUs 302 and is configured to implement applications in virtualization, AI inferencing, machine learning, enterprise server, software-defined storage, or cloud computing. In some embodiments, the server 120 further includes a nonvolatile memory express (NVMe) drive 304 or a serial advanced technology attachment (SATA) drive 306 for accessing mass storage devices (e.g., hard drives 214, optical drives, and SSDs 212) and handling data workloads. Referring to FIG. 3B, in an example, the server 120 may include 12 drive bays 308 each of which is configured to receive a respective NVMe drive 304 or SATA drive 306. Additionally, in some embodiments, the server 120 further includes a plurality of memory slots 310 for receiving one or more memory modules 204 (e.g., double data rate synchronous dynamic random-access memory (DDR SDRAM) dual in-line memory module (DIMM)). In an example, the server 120 is housed in a compact 1U chassis and applied as a node in a data center.

In some embodiments, the server 120 includes a plurality of data transfer interfaces (not shown in FIG. 3A), allowing for high-speed connectivity and scalability options. In an example, the data transfer interfaces include a set of peripheral component interconnect express (PCIe) slots. GPUs or network devices 208 may be integrated in the server 120 via the PCIe slots. Further, referring to FIG. 3C, in some embodiments, a set of data transfer interface 312 include four 16-channel PCIe 5.0 slots and are exposed on a rear side of the server 120.

Referring to FIG. 3B, in some embodiments, a front side of the server 120 further includes one or more of: a power button 314, a universal serial bus (USB) 316, one or more status light emitting diodes (LEDs) 318, and a unique identification (UID) button 320. Referring to FIG. 3C, in some embodiments, the rear side of the server 120 further includes one or more of: a USB port 322, a local area network (LAN) port 324, a display port 326, and access interfaces 328 to PSUs 216.

Figure 4:
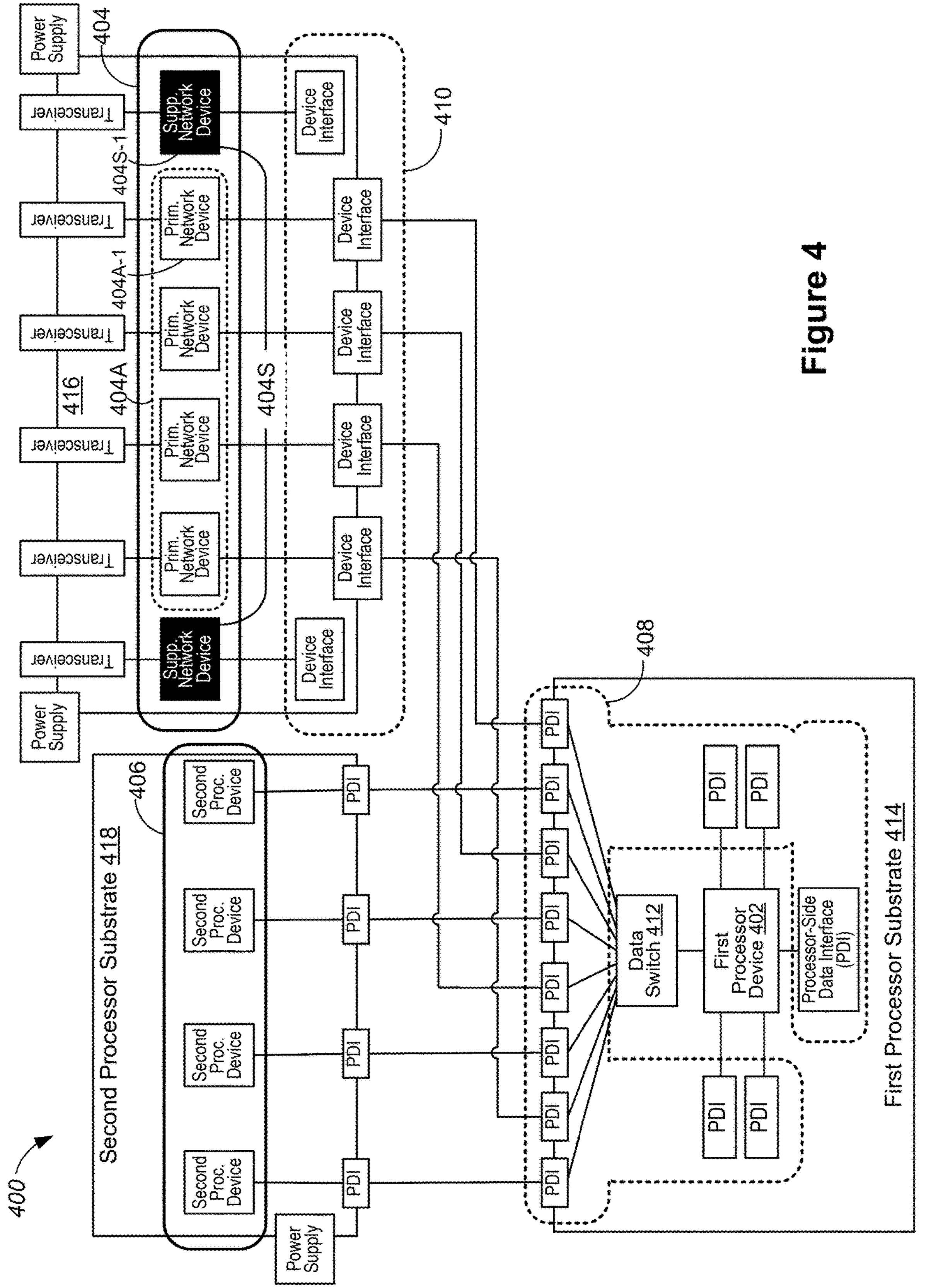
FIG. 4 is a block diagram of an example computer system including a first processor device and a plurality of network devices, in accordance with some embodiments.

FIG. 4 is a block diagram of an example computer system 400 (e.g., a server 120 in FIG. 1) including a first processor device 402 (e.g., a CPU 302, a BMC 224) and a plurality of network devices 404, in accordance with some embodiments. The plurality of network devices 404 are configured to receive input signals and provide output signals for the computer system 400, e.g., according to a plurality of network protocols. The plurality of network devices 404 includes a first set of primary network devices 404A and a set of supplemental network devices 404S. The first processor device 402 is coupled to the plurality of network devices 404. The first processor device 402 is configured to monitor operations of the first set of primary network devices 404A. In accordance with a determination that a first primary network device 404A-1 of the first set of primary network devices 404A has an error, the first processor device 402 configures a first supplemental network device 404S-1 of the set of one or more supplemental network devices 404S to replace the first primary network device 404A-1. In some embodiments, after the first supplemental network device 404S-1 replaces the first primary network device 404A-1, the first supplemental network device 404S-1 is regarded as one of the primary network devices 404A and monitored by the first processor device 402.

In some embodiments, each network device 404 is configured to manage, route, or facilitate network traffic, enabling communication within a network or the Internet. Examples of the network devices 404 include, but are not limited to an NIC (e.g., an Ethernet or Wi-Fi adapter), a network switch, a network router, a load balancer, a firewall, a WAP device, a modem, a repeater node, a network hub, a network bridge, a gateway, an intrusion detection and prevention system, and a VPN appliance. For example, the NIC includes a physical card for connecting to a network, and can be an Ethernet or Wi-Fi adapter. The network switch is configured to manage traffic among different servers 102 within a data center. The router is configured to direct data between different networks, and the server 120 may be used to route traffic, e.g., in enterprise networks or cloud environments. The load balancer is configured to distribute incoming network traffic. The firewall is configured to filter traffic to protect the server 120 from unauthorized access and potential threats. The modem is configured to modulate and demodulate signals for communication over telephone or cable lines. The repeater node is configured to amplify or regenerate signals.

In some embodiments, the computer system 400 further includes a plurality of second processor devices 406 (e.g., GPUs). The first processor device 402 pairs the plurality of second processor devices 406 with the first set of primary network devices 404A by pairing each second processor device 406 with at least one distinct primary network device 404A of the first set of primary network devices 404A. Referring to FIG. 4, in an example, the first processor device 402 is coupled to four primary network devices 404A and four second processor devices 406 and pairs each second processor device 406 with a distinct primary network device 404A. In another example not shown, one of the second processor devices 406 is paired with two or more primary network devices 404A.

In some embodiments, the computer system 400 further includes a plurality of processor-side data interfaces 408 coupled to the first processor device 402 and a plurality of device-side data interfaces 410 coupled to the plurality of network devices 404. Both the plurality of processor-side data interfaces 408 and the plurality of device-side data interfaces 410 are configured to operate based on a predefined data transfer protocol, and each processor-side data interface 408 and a respective device-side data interface 410 are uniquely associated with each other and have a predefined number of channels associated with the predefined data transfer protocol. For example, the predefined data transfer protocol is PCIe, and the predefined number is equal to an integer number in a range of 1-16 inclusively. In some embodiments, the first processor device 402 monitors operations of the first set of primary network devices 404A by monitoring a data communication status associated with each of the plurality of processor-side data interfaces 408 or receiving messages from the processor-side data interfaces 408 indicating whether respective primary network devices 404A coupled to the data interfaces 408 operate properly.

In some embodiments, the computer system 400 further includes a data switch 412 coupled between the first processor device 402 and the first set of primary network devices 404A. Stated another way, each network device 404 is indirectly coupled to the first processor device 402 by way of at least the data switch 412. The data switch 412 is configured to select the first set of primary network devices 404A (e.g., the plurality of network devices 404) to exchange data with the first processor device 402. Further, in some embodiments, the data switch 412 is coupled to the plurality of network devices 404 via the plurality of device-side data interfaces 410 and the plurality of processor-side data interfaces 408.

In some embodiments, the computer system 400 includes a first processor substrate 414 configured to support the first processor device 402 and an I/O device substrate 416, which is further configured to support the plurality of network devices 404. In an example, the first processor substrate 414 includes a motherboard of the server 120, and the second processor devices 406 are also mounted on the motherboard. Alternatively, in some embodiments, the first processor device 402 pairs the plurality of second processor devices 406 with the first set of primary network devices 404A. The computer system 400 includes a second processor substrate 418 for supporting the plurality of second processor device 406, and the second processor substrate 418 is separate from the first processor substrate 414 and the I/O device substrate 416. In some embodiments, each of the first processor substrate 414, the I/O device substrate 416, and the second processor substrate 414, if any, has a respective power supply.

Figure 5:
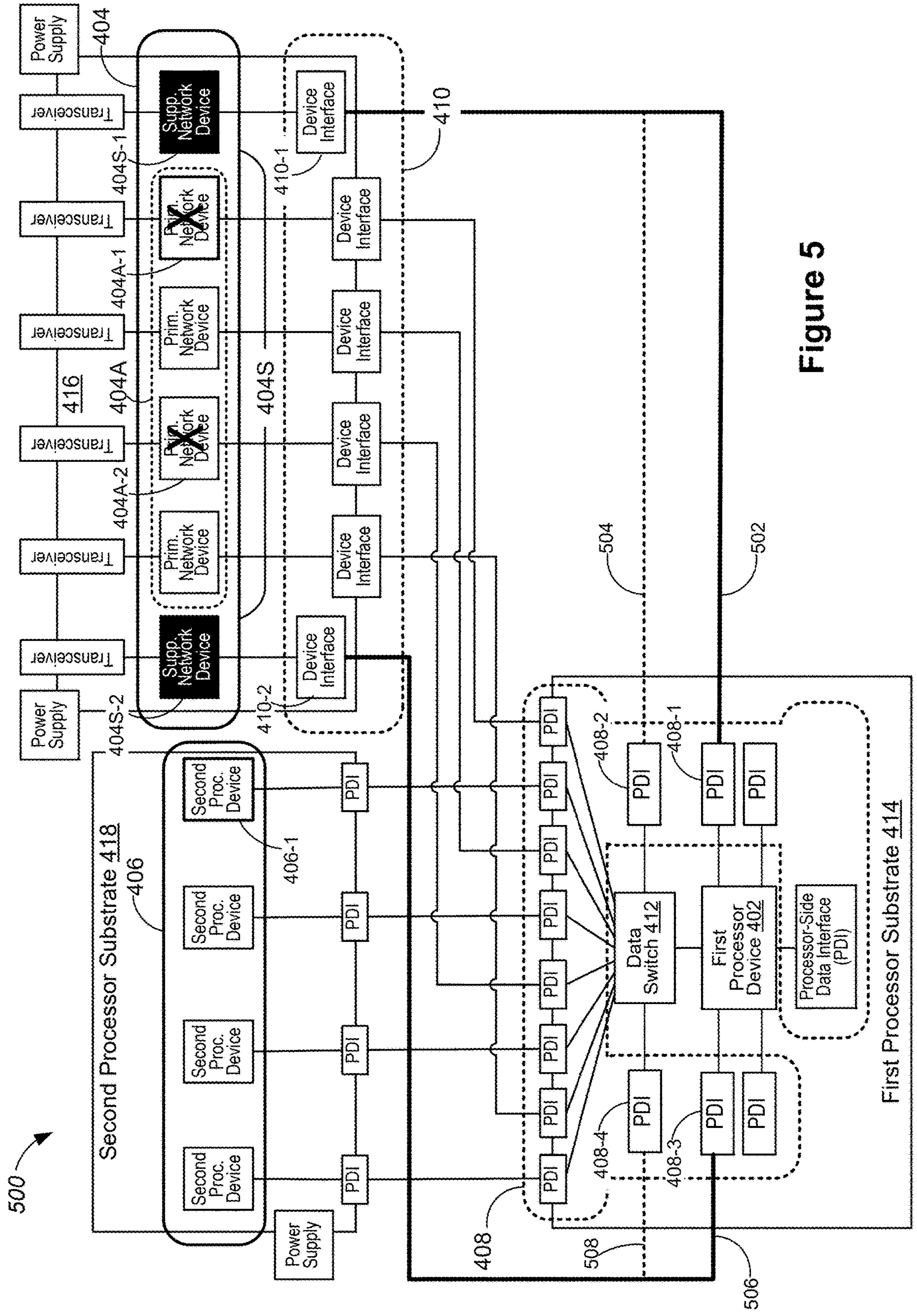
FIG. 5 is a block diagram of an example computer system in which one or more supplemental network devices are applied in place of one or more respective primary network devices, in accordance with some embodiments.

FIG. 5 is a block diagram of an example computer system 500 (e.g., a server 120 in FIG. 1) in which one or more supplemental network devices 404S are applied in place of one or more respective primary network devices 404A, in accordance with some embodiments. The computer system 500 includes a first processor device 402 (e.g., a CPU 302, a BMC 224) and a plurality of network devices 404 for receiving input signals and providing output signals for the computer system 500. The plurality of network devices 404 includes a first set of primary network devices 404A and a set of supplemental network devices 404S. The first processor device 402 monitors operations of the first set of primary network devices 404A. In accordance with a determination that a first primary network device 404A-1 of the first set of primary network devices 404A has an error, the first processor device 402 configures a first supplemental network device 404S-1 of the set of one or more supplemental network devices 404S to replace the first primary network device 404A-1.

In some embodiments, the first supplemental network device 404S-1 is coupled (502) to the first processor device 402 via a respective device-side data interface 410-1 and a respective processor-side data interface 408-1, e.g., without involving a data switch 412. Alternatively, in some embodiments, the first supplemental network device 404S-1 is coupled (504) to the first processor device 402 via a device-side data interface 410-1, a processor-side data interface 408-2, and a data switch 412.

In some embodiments, the first processor device 402 monitors operation of the first primary network device 404A-1 by at least determining that the first primary network device 404A-1 has the error and identifying a respective second processor device 406-1 that is paired with the first primary network device 404A-1. The first processor device 402 replaces the first primary network device 404A-1 with the first supplemental device 404S-1 by at least pairing the first supplemental network device 404S-1 with the respective second processor device 406-1 in place of the first primary network device 404A-1.

In some embodiments, the first processor device 402 monitors operation of the first primary network device 404A-1 by at least determining that the first primary network device 404A-1 has the error and that the error cannot be corrected using a plurality of error-handling operations. The first supplemental network device 404S-1 is configured to replace the first primary network device 404A-1 in accordance with a determination that the error cannot be corrected using the plurality of error-handling operations. In some embodiments, the plurality of error-handling operations are predefined, and implemented by the first processor device 402 to correct the error detected in the first primary network device 404A-1. Replacement of the first primary network device 404A-1 occurs if all of the plurality of error-handling operations have failed to correct the error.

In some embodiments, the error includes one of a hardware failure, a driver or firmware issue, a resource exhaustion or overload, a signal integrity issue, and a link layer protocol error. Examples of the hardware failure include, but are not limited to, a physically damaged component, memory corruption, malfunctioning circuitry, a cable or connector issue, and a transceiver problem. Examples of the driver or firmware issue include, but are not limited to, an outdated, corrupted, or incompatible driver and a firmware bug or glitch. Examples of the resource exhaustion or overload include, but are not limited to, a buffer overflow and high traffic or network congestion. Examples of the signal integrity issues include, but are not limited to, electromagnetic interference (EMI) and signal loss or jitter. Examples of the link layer protocol errors include, but are not limited to, a cyclic redundancy check (CRC) failure and a loss of synchronization.

In some embodiments, in accordance with a determination that each of one or more second primary network devices 404A-2 of the plurality of network devices 404 has a respective error, the first processor device 402 configures a respective second supplemental network device 404S-2 of the set of one or more supplemental network devices 404S to replace the respective second primary network device 404A-2. Further, in some embodiments, the respective second supplemental network device 404S-2 is coupled (506) to the first processor device 402 directly via respective data interfaces 408-3 and 410-2. Alternatively, in some embodiments, the respective second supplemental network device 404S-2 is coupled (508) to the first processor device 402 indirectly via the data switch 412 and the respective data interfaces 408-4 and 410-2.

In some embodiments, a CPU and GPUs of a server 120 are applied to implement artificial intelligence operations (e.g., model training, data inference). When the first primary network device 404A-1 disposed on the substrate 416 (e.g., a PCB) fails its operation, the second processor device 406-1 (e.g., a GPU), which is paired with the first primary network device 404A-1, cannot communicate data via the first primary network device 404A-1. The first processor device 402 includes a BMC 224 (FIG. 2) of the server 120, and executes an intelligent platform management interface (IPMI). A command is executed in the IPMI (e.g., on a firmware level) to replace the failed primary network device 404A-1 with the first supplemental network device 404S-1.

Figure 6:
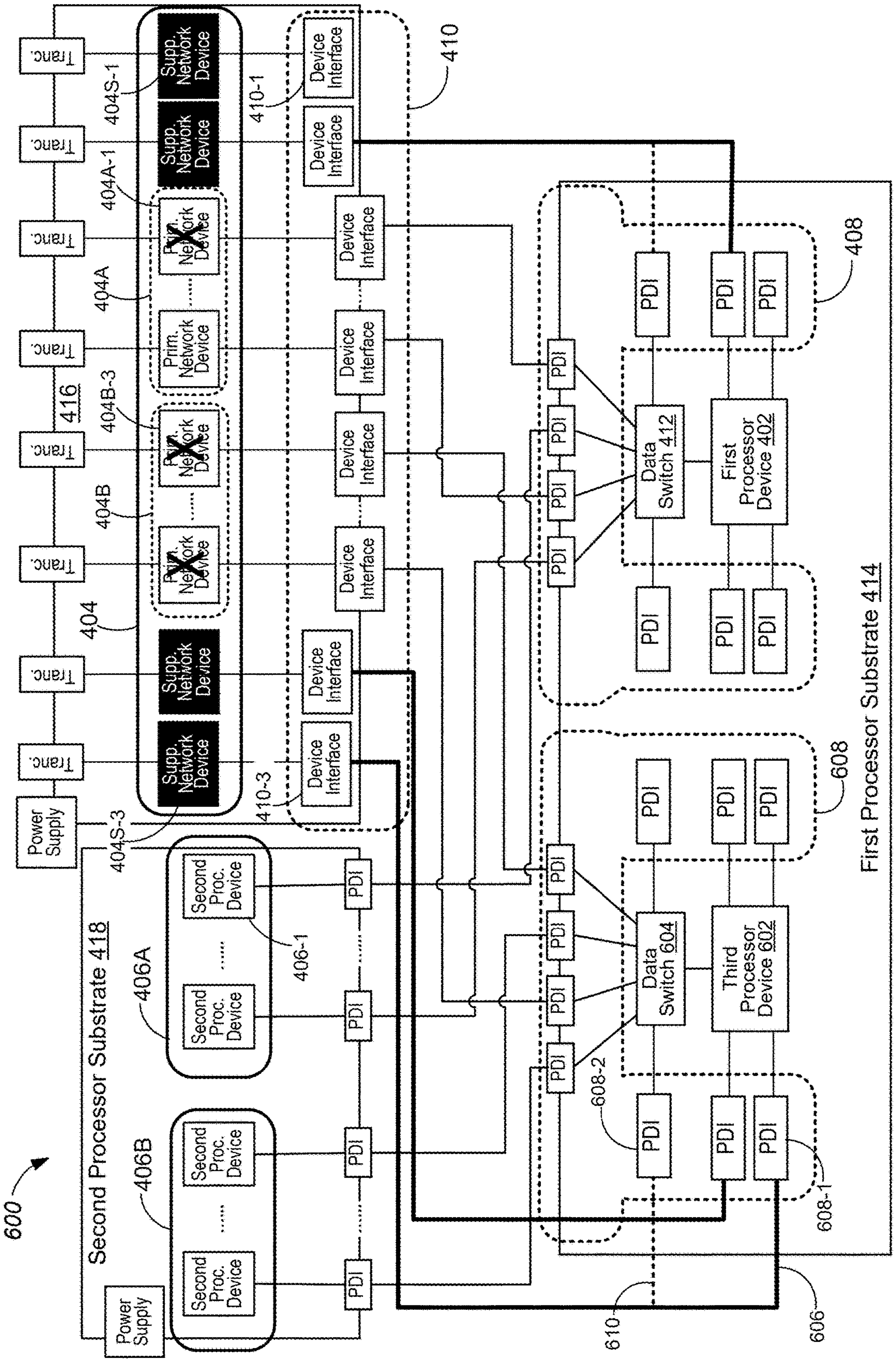
FIG. 6 is a block diagram of an example computer system including two processor devices and one or more supplemental network devices, in accordance with some embodiments.

FIG. 6 is a block diagram of an example computer system 600 (e.g., a server 120 in FIG. 1) including two processor devices 402 and 602 and one or more supplemental network devices 404S, in accordance with some embodiments. The computer system 600 includes a first processor device 402 (e.g., a CPU 302, a BMC 224), a third processor device 602, and a plurality of network devices 404 for receiving input signals and providing output signals for the computer system 600. The plurality of network devices 404 includes a first set of primary network devices 404A, a second set of primary network devices 404B, and a set of one or more supplemental network devices 404S. The first processor device 402 monitors operations of the first set of primary network devices 404A. In accordance with a determination that a first primary network device 404A-1 of the first set of primary network devices 404A has an error, the first processor device 402 configures a first supplemental network device 404S-1 of the set of one or more supplemental network devices 404S to replace the first primary network device 404A-1.

In some embodiments, the plurality of network devices 404 include a second set of primary network devices 404B. A third processor device 602 is coupled to the plurality of network devices, and monitors operations of the second set of primary network devices 404B. In accordance with a determination that each of one or more third primary network device 404B-3 of the second set of primary network devices has a respective error, the third processor device 602 configures a respective third supplemental network device 404S-3 of the set of one or more supplemental network devices 404S to replace the respective third primary network device 404B-3.

In some embodiments, the computer system 400 includes a first processor substrate 414 configured to support the first processor device 402 and the third processor device 602, and an I/O device substrate 416 is configured to support the plurality of network devices 404. The first processor device 402 pairs the plurality of second processor devices 406 with the first set of primary network devices 404A. The computer system 400 includes a second processor substrate 418 for supporting the plurality of second processor device 406, and the second processor substrate 418 is separate from the first processor substrate 414 and the I/O device substrate 416. In some embodiments, each of the first processor substrate 414, the I/O device substrate 416, and the second processor substrate 414, if any, has a respective power supply.

In some embodiments, the computer system 400 includes a first processor substrate 414 configured to support the first processor device and the third processor device 602, and the I/O device substrate 416 is configured to support the plurality of network devices 404. Further, in some embodiments, the computer system 500 further includes a plurality of second processor devices 406 and a second processor substrate 418 for supporting the plurality of second processor device 406. The second processor devices 406 are coupled to both the first processor device 402 and the third processor device 602. The first processor device 402 and the third processor device 602 are further configured to pair two distinct subsets 406A and 406B of the plurality of second processor devices 406 with the first set of primary network devices 404A and the second set of primary network devices 404B, respectively. More specifically, a first subset 406A of second processor devices 406 is paired to the first set of primary network devices 404A, and a second subset 406B of second processor devices 406 is paired to the second set of primary network devices 404B.

Further, in some embodiments, in accordance with a determination that a third primary network devices 404B-3 of the second set of primary network device 404B have a respective error, the first processor device 402 configures a respective one 404S-3 of the set of one or more supplemental network devices 404S to replace the third primary network device 404B-3. Additionally, in some embodiments, the respective third supplemental network device 404S-3 is coupled (606) to the third processor device 602 directly via respective data interface 608-1 and 410-3. Alternatively, in some embodiments, the respective third supplemental network device 404S-3 is coupled (610) to the third processor device 602 indirectly via the data switch 604 and the respective data interfaces 608-2 and 410-3.

Figure 7A:
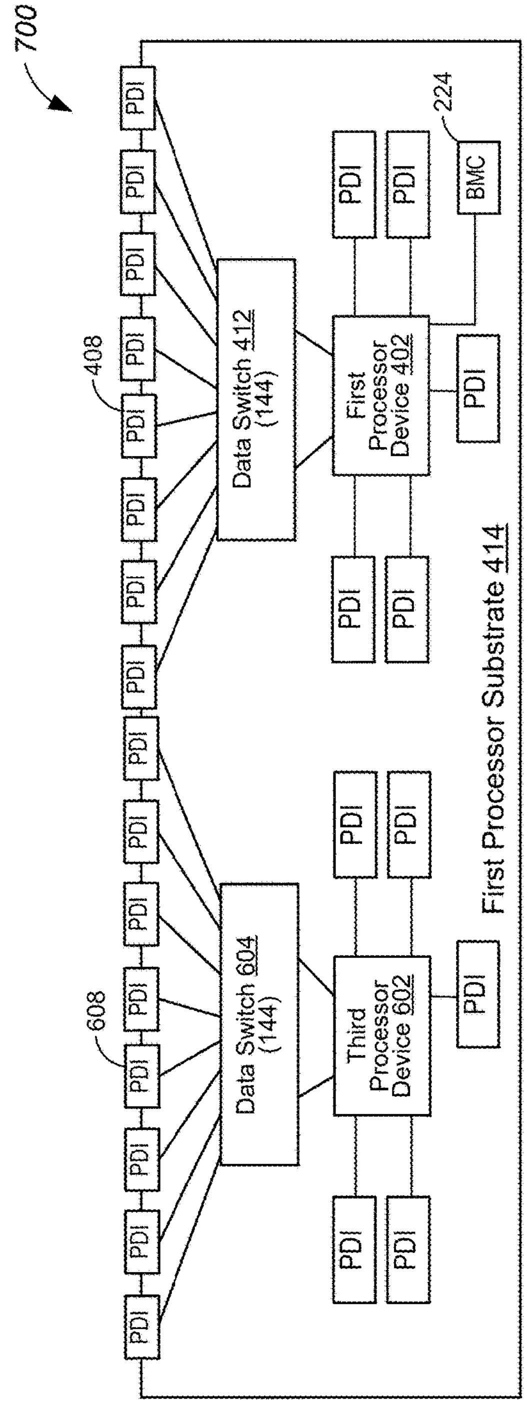
FIG. 7A is a block diagram of an example processor system of a computer system including two processor devices each of which is coupled to a respective data switch, in accordance with some embodiments.
Figure 7B:
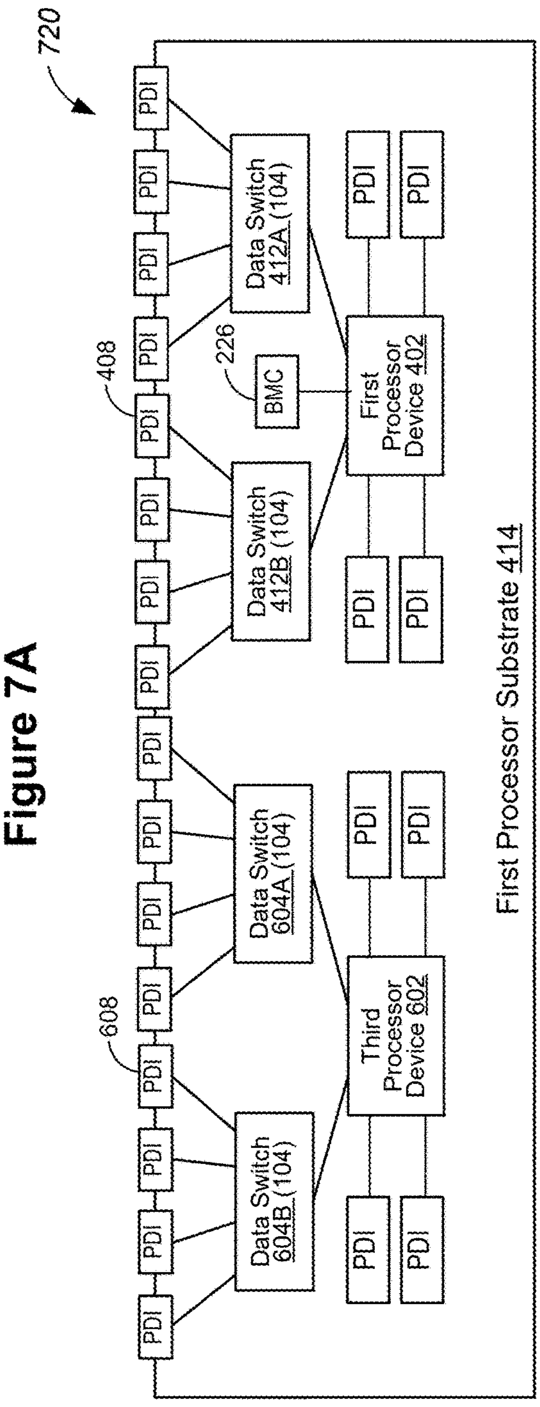
FIG. 7B is a block diagram of an example processor system of a computer system including two processor devices each of which is coupled to two respective data switches, in accordance with some embodiments.
Figure 7C:
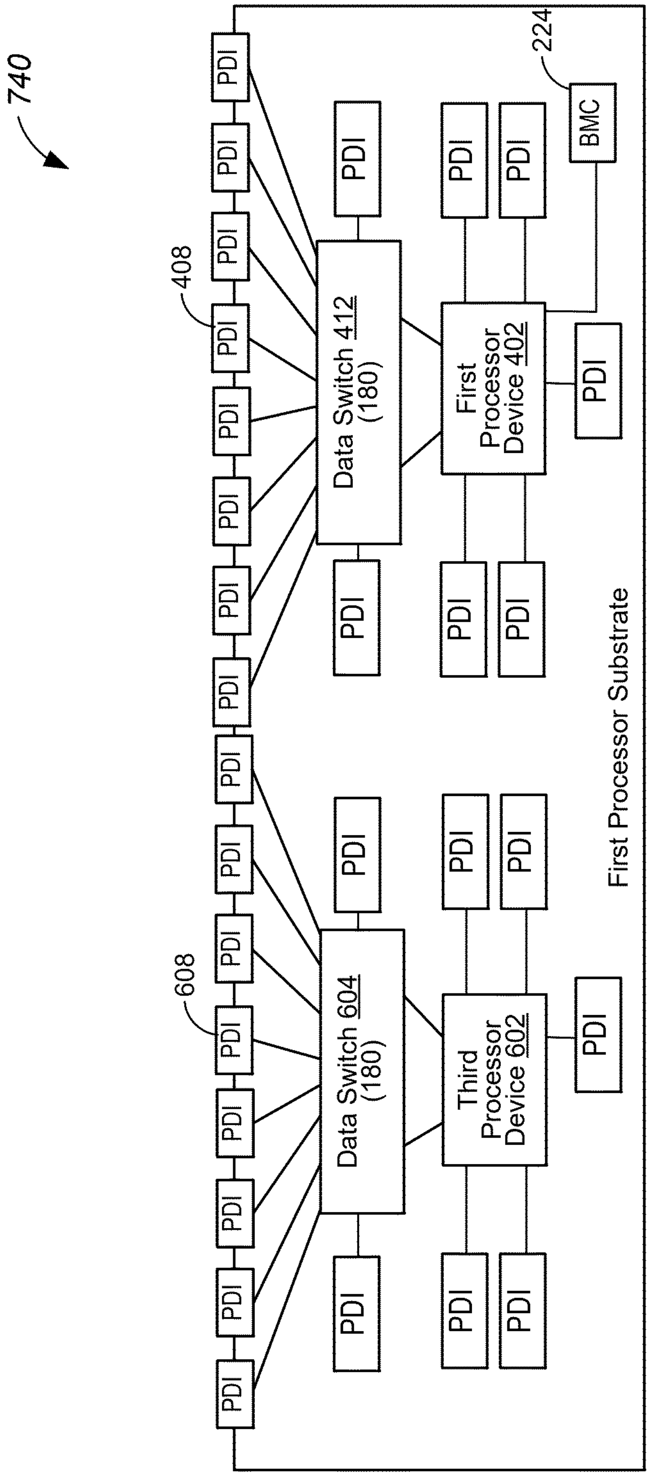
FIG. 7C is a block diagram of another example processor system including two processor devices each of which is coupled to a respective data switch, in accordance with some embodiments.

FIG. 7A is a block diagram of an example processor system 700 of a computer system (e.g., computer system 600 in FIG. 6) including two processor devices 402 and 602 each of which is coupled to a respective data switch, in accordance with some embodiments. FIG. 7B is a block diagram of an example processor system 720 of a computer system including two processor devices 402 and 602 each of which is coupled to two respective data switches, in accordance with some embodiments. FIG. 7C is a block diagram of another example processor system 740 including two processor devices 402 and 602 each of which is coupled to a respective data switch, in accordance with some embodiments. Each of the processor systems 700, 720, and 740 is formed on a first processor substrate 414, and includes a first processor device 402 (e.g., a first CPU), a third processor device 602 (e.g., a second CPU), a BMC 224, a plurality of data interfaces 408 and 608. In some embodiments, for each processor device 402 or 602, the plurality of data interfaces 408 or 608 include one or more data interfaces coupled directly to the respective processor device 402 or 602. Alternatively or additionally, for each processor device 402 or 602, the plurality of data interfaces 408 or 608 include a subset of data interfaces coupled to the respective processor device 402 or 602 indirectly (e.g., via the data switch 412 or 604 in FIG. 7A, via the data switch 412A, 412B, 604A, or 604B in FIGS. 7B and 7C).

In some embodiments, a first primary network switch 404A-1 (not shown) is coupled to a first processor device 402 via at least a data switch (e.g., switch 412 in FIG. 7A, switch 412A or 412B in FIGS. 7B and 7C). When the first primary network device 404A-1 (FIG. 5) is replaced with a first supplemental network device 404S-1, the first supplemental network device 404S-1 is coupled to the first processor device 402 via the data switch or without passing the data switch. Further, in some embodiments, when two primary network switches 404A-1 and 404A-2 (FIG. 5) are replaced with two respective supplemental network devices 404S-1 and 404S-2, the two supplemental network devices 404S-1 and 404S-2 are coupled to the first processor device 402 via the data switch or without passing the data switch, independently of each other. In some embodiments, when a third primary network switch 404B-3 (FIG. 6) is replaced with a third supplemental network device 404S-3, the third supplemental network device 404S-3 is coupled to the third processor device 602 via a data switch (e.g., switch 604 in FIG. 7A, switch 604A or 604B in FIGS. 7B and 7C) or without passing the data switch.

In some embodiments, each data interface 408 or 608 includes 16 data channels. Referring to FIG. 7A, in some embodiments, the first processor device 402 is coupled to a data switch 412 having 144 PCIe switches, and the data switches 412 are further coupled to 8 data interfaces 408 having 144 data channels in total, therefore utilizing all 144 out of the 144 PCI switches of the data switch 412. Referring to FIG. 7B, in some embodiments, the first processor device 402 is coupled to two data switches 412A and 412B each of which has 104 PCIe switches, and each data switch 412A or 412B is further coupled to 4 data interfaces 408 having 64 data channels in total. In other words, for each data switch 412A or 412B, 64 of the 104 PCIe switches are applied to control the 64 data channels, and 44 free data switches remains free for controlling 44 data channels. Referring to FIG. 7C, in some embodiments, the first processor device 402 is coupled to a data switch 412 having 180 PCIe switches, and the data switches 412 are further coupled to 10 data interfaces 408 having 160 data channels in total, therefore utilizing 160 out of the 180 PCI switches of the data switch 412.

In some embodiments, in accordance with a determination whether a data switch 412, 412A, or 412B has an unused switch component (e.g., an unused PCIe switch), a computer system determines whether a supplemental network device 404S replacing a primary network device 404A is directly coupled to the first processor device 402 or indirectly coupled to the first processor device 402 via the data switch 412, 412A, or 412B. For example, in some situations (e.g., associated with FIG. 7A), all switch components of the data switch 412 have been used to couple the primary network devices 404A or the second processor devices 406. The supplemental network device 404S replacing a primary network device 404A having an error may need to be directly coupled to the first processor device 402. Alternatively, in some situations (e.g., associated with FIG. 7B or 7C), a set of switch components of the data switch 412 have not been used to couple the primary network devices 404A or the second processor devices 406. The supplemental network device 404S replacing a primary network device 404A having an error may be directly coupled to the first processor device 402 or indirectly coupled to the first processor device 402 via the data switch 412, 412A, or 412B.

Figure 8:
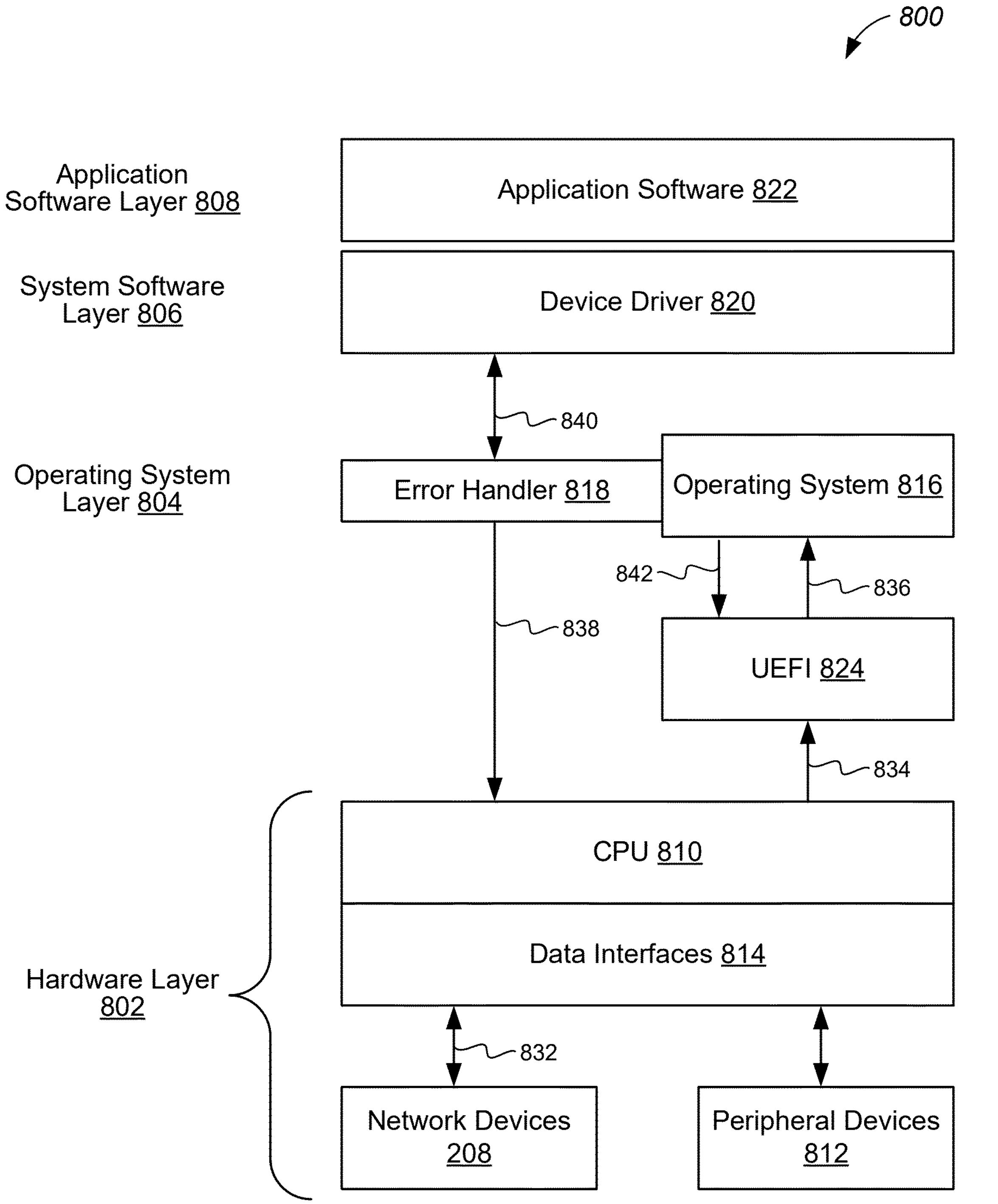
FIG. 8 is a schematic diagram of a computer system that manages network devices on a firmware level, in accordance with some embodiments.
Figure 9:
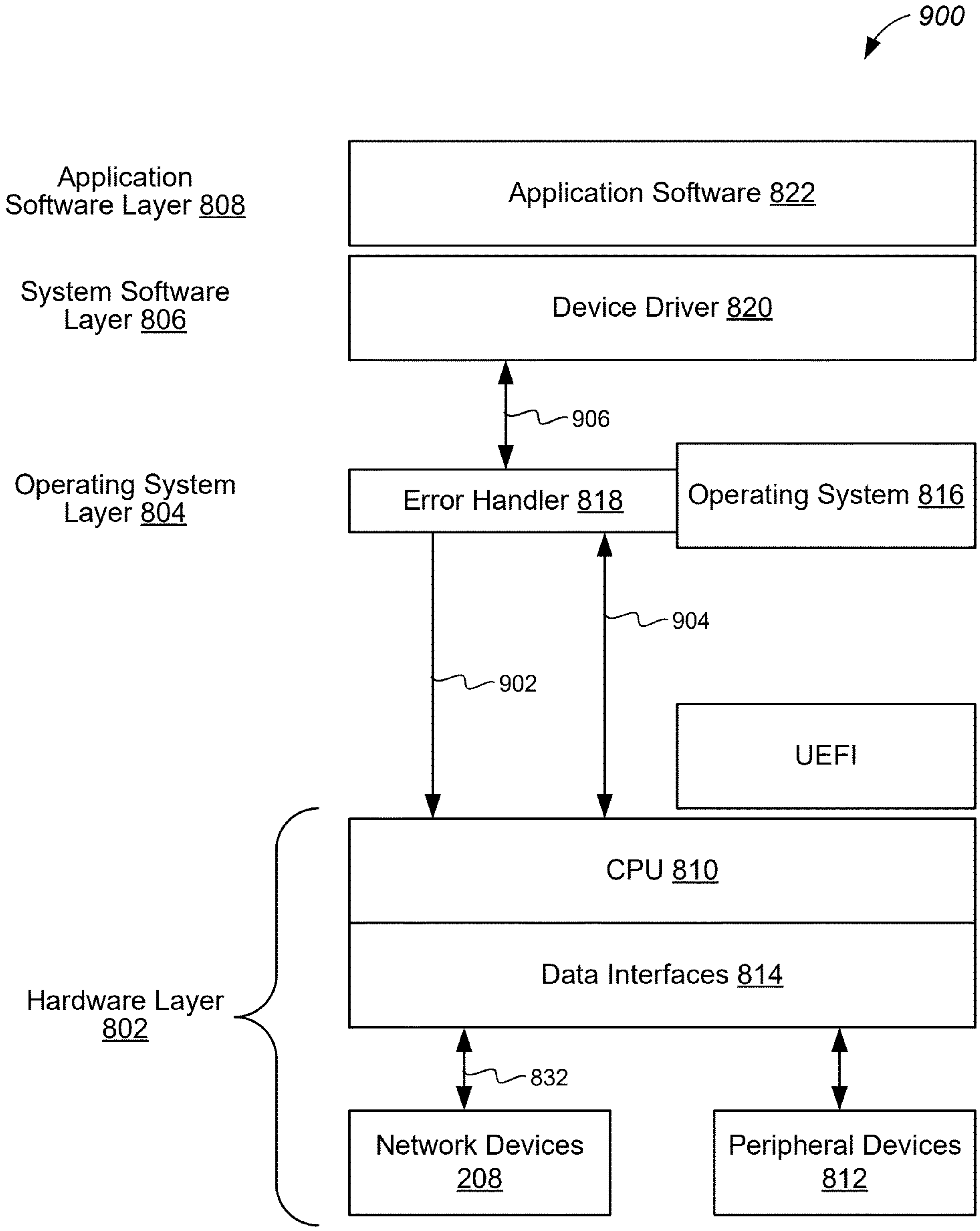
FIG. 9 is a schematic diagram of a computer system that manages network devices on a software level, in accordance with some embodiments.

FIG. 8 is a schematic diagram of a computer system 800 that manages network devices 404 on a firmware level, in accordance with some embodiments. FIG. 9 is a schematic diagram of a computer system 900 that manages network devices 404 on a software level, in accordance with some embodiments. Each of the computer system 800 or 900 includes a hardware layer 802, an operating system layer 804, a system software layer 806, and an application software layer 808. The hardware layer 802 includes a processor module 202 (e.g., a CPU 810, processor devices 402 and/or 602 in FIGS. 4-7C), a memory modules 204, storage devices (e.g., SSDs 212, hard drive 214), network devices 208 (e.g., network devices 404 in FIGS. 4-6), and other peripheral devices 812. The network devices 208 and the peripheral devices 812 may be coupled to the CPU 810 via data interfaces 814 (e.g., PCIe) The operating system layer 804 sits atop the hardware, serves as an intermediary between hardware and system software, and is configured to manage hardware resources and provide a stable, consistent way for software applications to interact with the hardware without needing to know the specifics of the hardware. In some embodiments, an operating system 816 includes an error handler 818, and is implemented on the operating system layer 804. The system software layer 806 is applied for system maintenance, performance enhancement, and bridging the gap between the operating system 816 and application software 822. Examples of the firmware programs include, but are not limited to, utility software, device drivers 820, and compilers. The application software layer 808 includes software application 822 (e.g., web browser, video games), which utilizes the functionalities provided by the underlying layers to deliver a wide range of functionalities for productivity, task management, and enhancement of user experience.

In some embodiments, the computer system 800 or 900 includes firmware stored in non-volatile memory like read-only memory (ROM) or flash memory. The firmware includes low-level software that is embedded directly into hardware components, and provides a basic control layer that bridges the hardware layer 802 with the operating system layer 804. In an example, the firmware includes a Basic Input/Output System (BIOS) or a Unified Extensible Firmware Interface (UEFI) 824, which initializes and configures hardware at startup and provides an interface between hardware and the operating system 816.

Referring to FIG. 8, in some embodiments, a first processor device 402 (e.g., the CPU 810) is configured to execute a firmware program (e.g., the UEFI 824) to determinate that a first primary network device 404A-1 has an error and enable a system management mode (SMM) in which a first supplemental network device 404S-1 replaces the first primary network device 404A-1. Execution of the operating system 816 may be suspended in the SMM, allowing the firmware program to be executed with a priority. The firmware program keeps the device driver 820 associated with the first primary network device 404A-1 having the error and re-links the device driver 820 to the first supplemental network device 404S-1.

More specifically, in some embodiments, an uncorrected error of the first primary network device 404A-1 (FIG. 5) is detected (operation 832) by a root port. For example, transaction layer packets (TLPs) facilitate the transfer of data between PCIe devices via requests and completions, and the uncorrected error may be detected based on malformed TLPs. An enhanced downstream port containment (EDPC) status and an error source identification (ID) are logged in. A root port programmed IO (RP PIO) status is logged off if applicable. The root port sends (operation 834) a system control interrupt to the UEFI 824, which detects the EDPC status, reads Advanced Error Reporting (AER) and EDPC registers, creates a system event log, and updates common platform error record tables. The UEFI 824 clears up an uncorrectable error (UCE) status and brings a link out of downstream port containment (DPC). An interrupt is delivered (operation 836) to the operating system 816, which notifies (operation 840) drivers 820 of the uncorrectable error. The error handler 818 returns (operations 838 and 842) related information to the UEFI 824 and the CPU 810. The UEFI 824 enables the SMM and replaces the first primary network device 404A-1 with the first supplemental network device 404S-1. A hot-plug surprise insertion interrupt may be delivered to the operating system 816.

Referring to FIG. 9, in some embodiments, a first processor device 402 (e.g., the CPU 810) is configured to execute an operating system 816 including an error handler 818 to determinate that a first primary network device 404A-1 (FIG. 5) has an error, release the first primary network device 404A-1, and retrain and engage a first supplemental network device 404S-1. In some embodiments, upon detecting the error with the first primary network device 404A-1, the computer device continues execution of the operating system 816 on the first processor device 402, and the device driver 820 and the operating system 816 collaborate with each other to re-links the device driver 820 to the first supplemental network device 404S-1.

More specifically, in some embodiments, an uncorrected error of the first primary network device 404A-1 (FIG. 5) is detected (operation 832) by a root port, e.g., based on malformed TLPs. Software triggered DPC may be used for a validation purpose. An enhanced downstream port containment (EDPC) status and an error source identification (ID) are logged in. A root port programmed IO (RP PIO) status is logged off if applicable. The root port sends a system control interrupt to the UEFI 824, which detects the EDPC status, reads AER and EDPC registers, creates a system event log, and updates common platform or record tables. The UEFI 824 clears up an uncorrected error (UCE) status and brings a link out of downstream port containment (DPC). An interrupt is delivered (operation 902) to the operating system 816, which notifies (operation 906) the device drivers 820 of the uncorrectable error. The UEFI 824 enables the SMM and replaces the first primary network device 404A-1 with the first supplemental network device 404S-1. A hot-plug surprise insertion interrupt may be delivered to the operating system 816. The root port sends a message signal interrupt (MSI) to the error handler 818 of the operating system 816. The error handler 818 detects a DPC event. The DPC status and the error source ID are logged in, and the RP PIO status is logged if applicable. If the root port implements DPC capabilities, the operating system 816 attempts a recovery by releasing the link from DPC, link retraining and active, or restoring child devices to a working state. The error handler 818 returns (operation 904) related information to the CPU 810.

Figure 10:
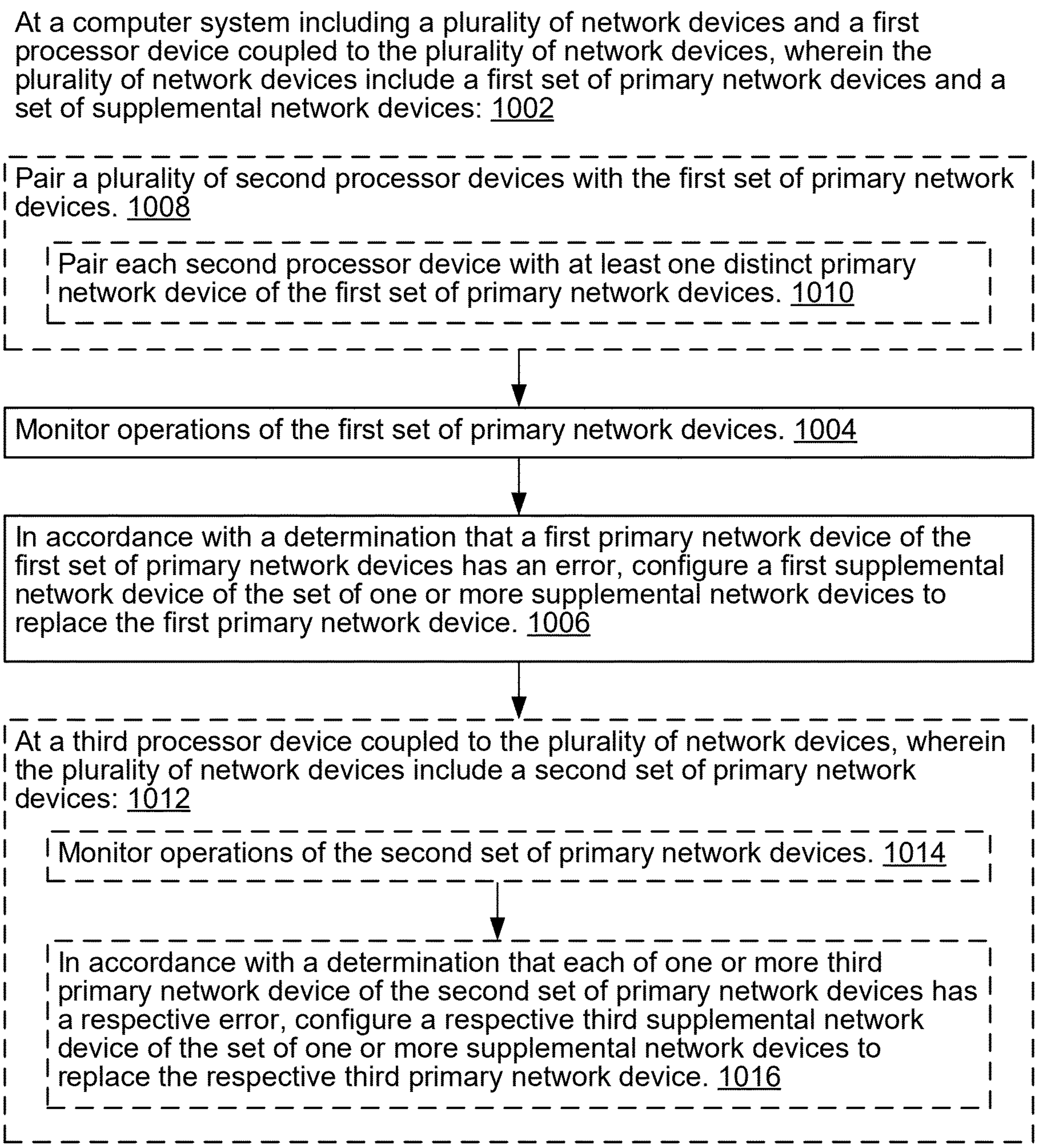
FIG. 10 is a flow diagram of an example method for managing network devices of a computer system, in accordance with some embodiments.

FIG. 10 is a flow diagram of an example method 1000 for managing network devices 404 of a computer system (e.g., a server 120 in FIG. 1), in accordance with some embodiments. In some embodiments, the method 1000 is governed by instructions that are stored in a non-transitory computer readable storage medium and are executed by one or more processors (e.g., BMC 224, CPU) of a computer system (e.g., computer systems in FIGS. 4-6). Each of the operations shown in FIG. 10 may correspond to instructions stored in the computer memory or computer readable storage medium of a server 120. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or other instruction format that is interpreted by one or more processors. Some operations in the method 1000 may be combined and/or the order of some operations may be changed.

The method 1000 is implemented (operation 1002) at a computer system including a plurality of network devices 404 and a first processor device 402 coupled to the plurality of network devices 404. The plurality of network devices 404 include a first set of primary network devices 404A and a set of one or more supplemental network devices 404S. The computer system monitors (operation 1004) operations of the first set of primary network devices 404A. In accordance with a determination that a first primary network device 404A-1 of the first set of primary network devices 404A has an error, the computer system configures (operation 1006) a first supplemental network device 404S-1 of the set of one or more supplemental network devices 404S to replace the first primary network device 404A-1.

In some embodiments, the first processor device 402 pairs (operations 1008) a plurality of second processor devices 406 with the first set of primary network devices 404A by pairing (operation 1010) each second processor device 406 with at least one distinct primary network device 404A of the first set of primary network devices 404A. Further, in some embodiments, the first processor device 402 includes a central processing unit (CPU), and each second processor device 406 includes a graphics processing unit (GPU). In some embodiments, the first processor device 402 monitors operation of the first primary network device 404A-1 by at least determining that the first primary network device 404A-1 has the error and identifying the respective second processor device 406-1 (FIG. 5) that is paired with the first primary network device 404A-1. The first processor device 402 replaces the first primary network device 404A-1 with the first supplemental network device 404S-1 by at least pairing the first supplemental network device 404S-1 with the respective second processor device 406-1 in place of the first primary network device 404A-1.

In some embodiments, the first processor device 402 monitors operation of the first primary network device 404A-1 by at least determining that the first primary network device 404A-1 has the error and determining that the error cannot be corrected using a plurality of error-handling operations. The first supplemental network device 404S-1 replaces the first primary network device 404A-1 in accordance with a determination that the error cannot be corrected using the plurality of error-handling operations.

In some embodiments, the computer system includes a plurality of processor-side data interfaces 408 coupled to the first processor device 402 and a plurality of device-side data interfaces 410 coupled to the plurality of network devices 404. Both the plurality of processor-side data interfaces 408 and the plurality of device-side data interfaces 410 operate based on a predefined data transfer protocol, and each processor-side data interface 408 and a respective device-side data interface 410 are uniquely associated with each other and have a predefined number of channels associated with the predefined data transfer protocol. Further, in some embodiments, the predefined data transfer protocol is Peripheral Component Interconnect Express (PCIe), and the predefined number equal to an integer number in a range of 1-16 inclusively.

In some embodiments, the computer system includes a data switch 412 (FIGS. 4-6) coupled between the first processor device 402 and the first set of primary network devices 404A. The data switch 412 selects the first set of primary network devices 404A to exchange data with the first processor device 402. Further, in some embodiments, the computer system further includes a plurality of processor-side data interfaces 408 coupled to the first processor device 402 and a plurality of device-side data interfaces 410 coupled to the plurality of network devices 404. The data switch 412 is coupled to the plurality of network devices 404 via the plurality of device-side data interfaces 410 and the plurality of processor-side data interfaces 408.

In some embodiments (e.g., associated with FIG. 5), the first supplemental network device 408S-1 is coupled to the first processor device 402 via a respective device-side data interface 410-1 and a processor-side data interface 408-1.

In some embodiments, the computer system includes a first processor substrate 414 configured to support the first processor device 402 and an input/output (I/O) device substrate 416 configured to support the plurality of network devices 404. Further, in some embodiments, the computer system further includes a plurality of second processor devices 406 coupled to the first processor device 402 and a second processor substrate 418 for supporting the plurality of second processor device 406. The first processor device 402 pairs the plurality of second processor devices 406 with the first set of primary network devices 404A.

In some embodiments, in accordance with a determination that each of one or more second primary network devices 404A-2 (FIG. 5) of the plurality of network devices 404 has a respective error, the first processor device 402 configures a respective second supplemental network device 404S-2 of the set of one or more supplemental network devices 404S to replace the respective second primary network device 404A-2.

In some embodiments, the plurality of network devices 404 include a second set of primary network devices 404B, and the computer system further includes (operation 1012) a third processor device 602 coupled to the plurality of network devices 404. The third processor device 602 monitors (operation 1014) operations of the second set of primary network devices 404B. In accordance with a determination that each of one or more third primary network devices 404B-3 of the second set of primary network devices 404B has a respective error, the third processor device 602 configures (operation 1016) a respective third supplemental network device 404S-3 of the set of one or more supplemental network devices 404S to replace the respective third primary network device 404B-3. Further, in some embodiments, the computer system further includes a first processor substrate 414 configured to support the first processor device 402 and the third processor device 602 and an input/output (I/O) device substrate 416 configured to support the plurality of network devices 404. In some embodiments, the computer system further includes a plurality of second processor devices 406 coupled to both the first processor device 402 and the third processor device 602 and a second processor substrate 418 for supporting the plurality of second processor device 406. The first processor device 402 and the third processor device 602 pairs two distinct subsets 406A and 406B (FIG. 6) of the plurality of second processor devices 406 with the first set of primary network devices 404A and the second set of primary network devices 404B, respectively In some embodiments, the first processor device 402 is configured to execute a firmware program to determinate that the first primary network device 404A-1 has the error and enable a system management mode (SMM) in which the first supplemental network device 404S-1 replaces the first primary network device 404A-1.

In some embodiments, the first processor device 402 is configured to execute an operating system including an error handler to determinate that the first primary network device 404A-1 has the error, release the first primary network device 404A-1, and retrain and engage the first supplemental network device 404S-1.

In some embodiments, each of the plurality of network devices 404 includes one of: a network interface card, a switch, a router, a load balancer, a firewall, a wireless access point, a modem, a repeater, a hub, a bridge, and a gateway device.

It should be understood that the particular order in which the operations in FIG. 10 have been described are merely exemplary and are not intended to indicate that the described order is the only order in which the operations could be performed. One of ordinary skill in the art would recognize various ways to manage signal timing on a serial data interface as described herein. Additionally, it should be noted that details of other processes described herein with respect to other figures (e.g., FIGS. 1-9) are also applicable in an analogous manner to method 1000 described above with respect to FIG. 10. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A computer system, comprising:

a plurality of network devices for receiving input signals and providing output signals, the plurality of network devices including a first set of primary network devices and a set of one or more supplemental network devices;

a first processor device coupled to the plurality of network devices, the first processor device configured to:

monitor operations of the first set of primary network devices; and in accordance with a determination that a first primary network device of the first set of primary network devices has an error, configure a first supplemental network device of the set of one or more supplemental network devices to replace the first primary network device;

a first processor substrate that supports the first processor device; and an input/output (I/O) device substrate that supports the plurality of network devices.

2. The computer system of claim 1, wherein the first processor device is further configured to:

pair a plurality of second processor devices with the first set of primary network devices by pairing each second processor device with at least one distinct primary network device of the first set of primary network devices.

3. The computer system of claim 2, wherein the first processor device includes a central processing unit (CPU), and each second processor device includes a graphics processing unit (GPU).

4. The computer system of claim 2, wherein the first processor device is configured to monitor operation of the first primary network device by at least:

determining that the first primary network device has the error;

identifying the respective second processor device that is paired with the first primary network device;

wherein the first processor device is configured to replace the first primary network device with the first supplemental network device by at least pairing the first supplemental network device with the respective second processor device in place of the first primary network device.

5. The computer system of claim 1, wherein the first processor device is configured to monitor operation of the first primary network device by at least:

determining that the first primary network device has the error; and determining that the error cannot be corrected using a plurality of error-handling operations;

wherein the first supplemental network device is configured to replace the first primary network device in accordance with a determination that the error cannot be corrected using the plurality of error-handling operations.

6. The computer system of claim 1, further comprising:

a plurality of processor-side data interfaces coupled to the first processor device; and a plurality of device-side data interfaces coupled to the plurality of network devices;

wherein both the plurality of processor-side data interfaces and the plurality of device-side data interfaces are configured to operate based on a predefined data transfer protocol, and each processor-side data interface and a respective device-side data interface are uniquely associated with each other and have a predefined number of channels associated with the predefined data transfer protocol.

7. The computer system of claim 6, wherein the predefined data transfer protocol is Peripheral Component Interconnect Express (PCIe), and the predefined number equal to an integer number in a range of 1-16 inclusively.

8. The computer system of claim 1, further comprising:

a data switch coupled between the first processor device and the first set of primary network devices, the data switch configured to select the first set of primary network devices to exchange data with the first processor device.

9. The computer system of claim 8, further comprising:

a plurality of processor-side data interfaces coupled to the first processor device; and a plurality of device-side data interfaces coupled to the plurality of network devices;

wherein the data switch is coupled to the plurality of network devices via the plurality of device-side data interfaces and the plurality of processor-side data interfaces.

10. The computer system of claim 1, wherein the first supplemental network device is coupled to the first processor device via a respective device-side data interface and a processor-side data interface.

11. The computer system of claim 1, further comprising:

a plurality of second processor devices coupled to the first processor device, wherein the first processor device is further configured to pair the plurality of second processor devices with the first set of primary network devices; and a second processor substrate for supporting the plurality of second processor devices.

12. A method, comprising:

at a computer system including a plurality of network devices and a first processor device coupled to the plurality of network devices, wherein the plurality of network devices include a first set of primary network devices and a set of supplemental network devices:

monitoring operations of the first set of primary network devices; and in accordance with a determination that a first primary network device of the first set of primary network devices has an error, configuring a first supplemental network device of the set of one or more supplemental network devices to replace the first primary network device;

wherein the first processor device is supported by a first processor substrate, and the plurality of network devices are supported by an input/output (I/O) device substrate.

13. The method of claim 12, further comprising:

in accordance with a determination that each of one or more second primary network devices of the plurality of network devices has a respective error, configuring a respective second supplemental network device of the set of one or more supplemental network devices to replace the respective second primary network device.

14. The method of claim 12, wherein the plurality of network devices includes a second set of primary network devices, and the computer system further includes a third processor device coupled to the plurality of network devices, the method further comprising:

monitoring operations of the second set of primary network devices; and in accordance with a determination that each of one or more third primary network devices of the second set of primary network devices has a respective error, configuring a respective third supplemental network device of the set of one or more supplemental network devices to replace the respective third primary network device.

15. The method of claim 14, wherein the first processor substrate supports both the first processor device and the third processor device.

16. The method of claim 14, wherein the computer system further comprises:

a plurality of second processor devices coupled to both the first processor device and the third processor device, wherein the first processor device and the third processor device are further configured to pair two distinct subsets of the plurality of second processor devices with the first set of primary network devices and the second set of primary network devices, respectively; and a second processor substrate for supporting the plurality of second processor devices.

17. The method of claim 12, further comprising:

executing, at the first processor device, an operating system including an error handler, including:

determining that the first primary network device has the error;

releasing the first primary network device; and retraining and engaging the first supplemental network device.

18. A non-transitory computer-readable storage medium, having instructions stored thereon, which when executed by a first processor device of a computer system cause the first processor device to perform operations comprising:

monitoring operations of a first set of primary network devices, wherein the first processor device is coupled to a plurality of network devices, the plurality of network devices including the first set of primary network devices and a set of supplemental network devices; and in accordance with a determination that a first primary network device of the first set of primary network devices has an error, configuring a first supplemental network device of the set of one or more supplemental network devices to replace the first primary network device;

wherein the first processor device is supported by a first processor substrate, and the plurality of network devices are supported by an input/output (I/O) device substrate.

19. The non-transitory computer-readable storage medium of claim 18, wherein the first processor device is configured to execute a firmware program to (1) determinate that the first primary network device has the error and (2) enable a system management mode (SMM) in which the first supplemental network device replaces the first primary network device.

20. The non-transitory computer-readable storage medium of claim 18, wherein the first processor device is configured to execute an operating system including an error handler to (1) determine that the first primary network device has the error, (2) release the first primary network device, and (3) retrain and engage the first supplemental network device.

* * * * *